Nov. 5, 1968   K. R. M. KARLSTROM   3,408,952
TOW TRUCK CONVEYOR SYSTEM
Filed Oct. 31, 1966   4 Sheets-Sheet 1
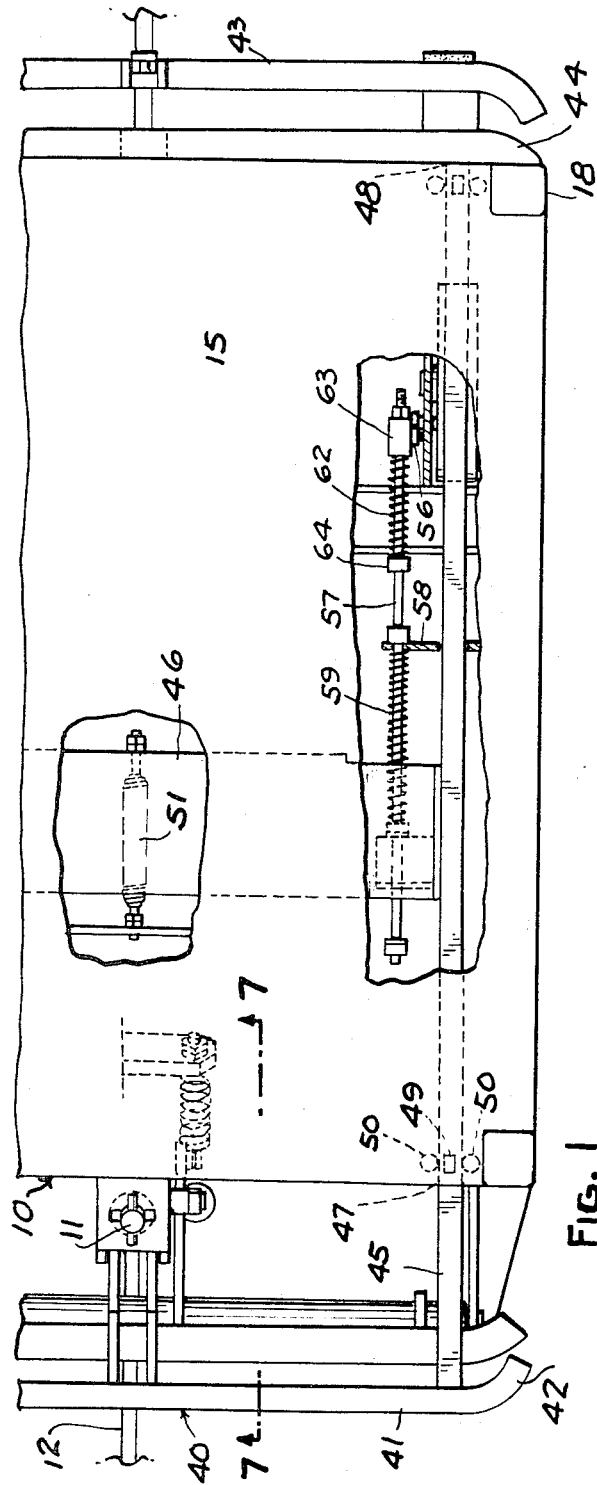
FIG. 1
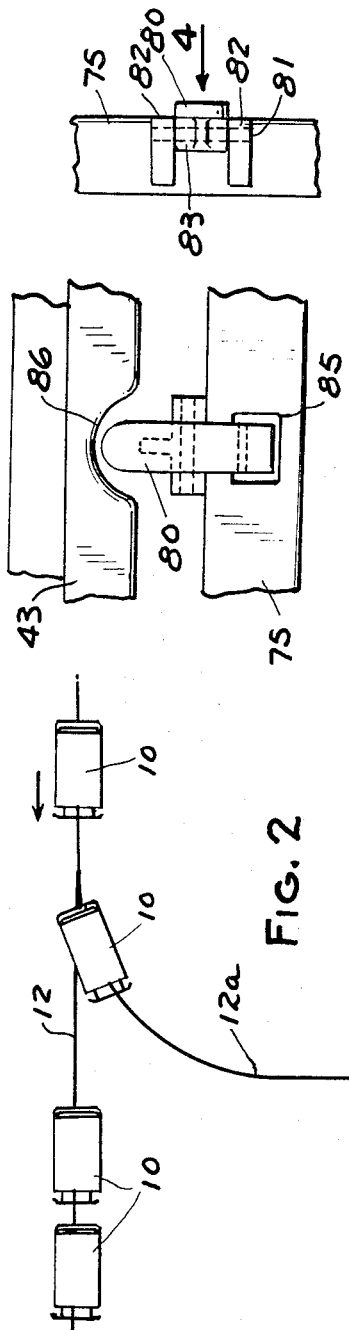
FIG. 3
FIG. 4
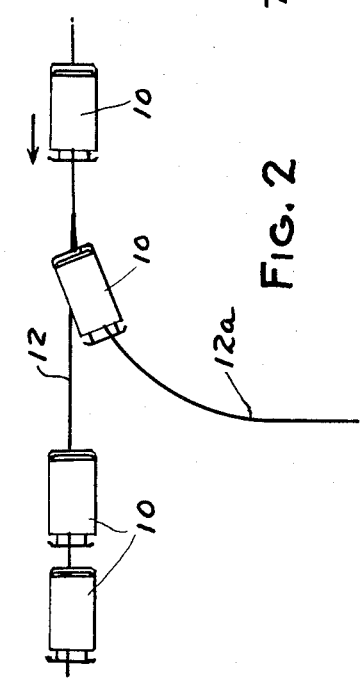
FIG. 2
INVENTOR.
KARL R. M. KARLSTROM
BY
Barnes, Kisselle, Raisch & Choate
ATTORNEYS Nov. 5, 1968 K. R. M. KARLSTROM 3,408,952
TOW TRUCK CONVEYOR SYSTEM
Filed Oct. 31, 1966 4 Sheets-Sheet 2
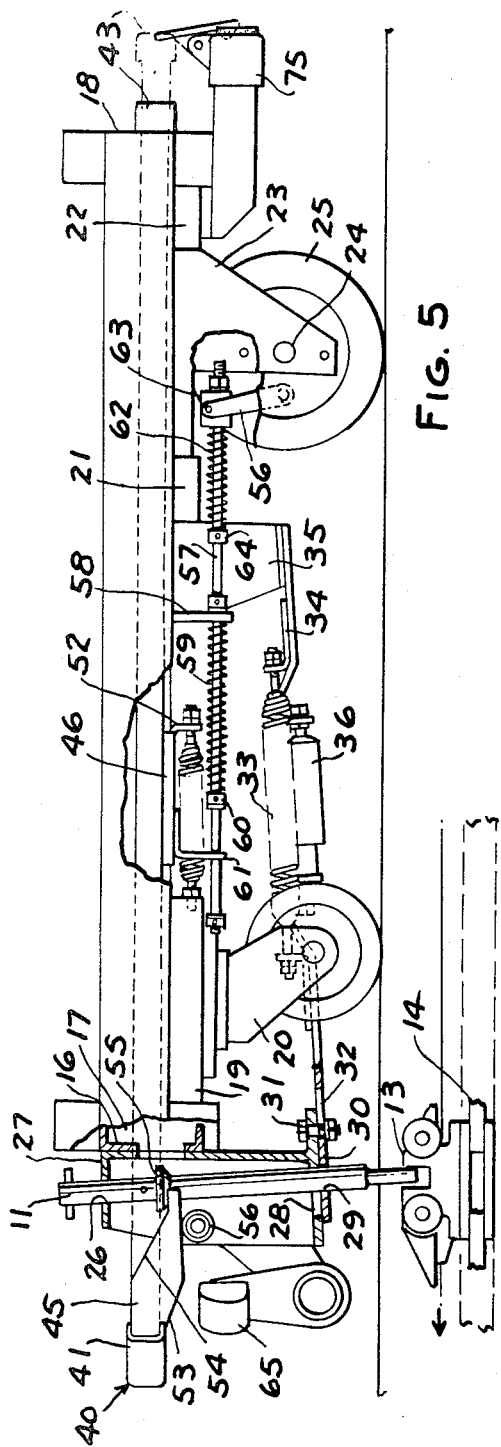
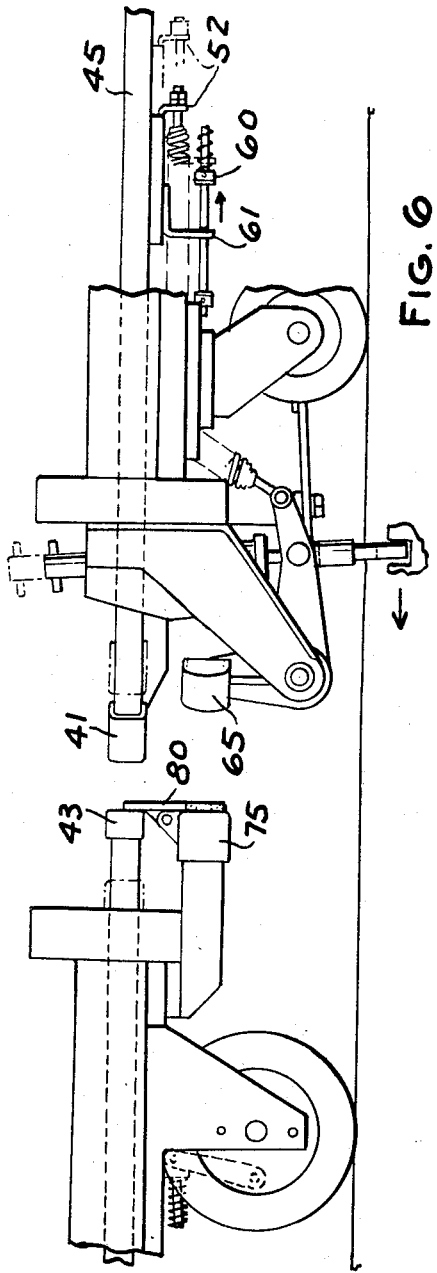
INVENTOR.
KARL R. M. KARLSTROM
BY
Barnes, Kisselle, Raisch & Choate
ATTORNEYS Nov. 5, 1968  K. R. M. KARLSTROM  3,408,952
TOW TRUCK CONVEYOR SYSTEM Filed Oct. 31, 1966  4 Sheets-Sheet 3

INVENTOR.
KARL R. M. KARLSTROM
BY
Barnes, Kisselle, Raisch & Choate
ATTORNEYS

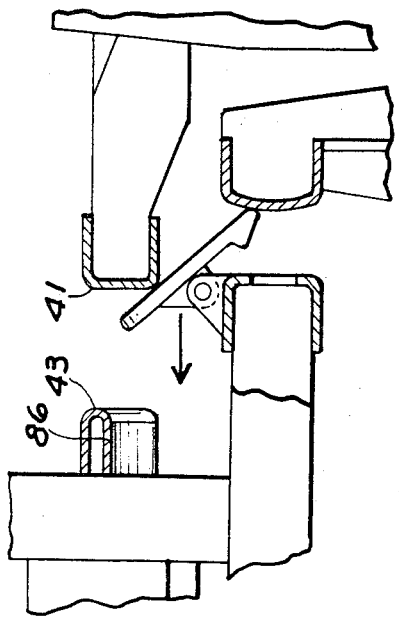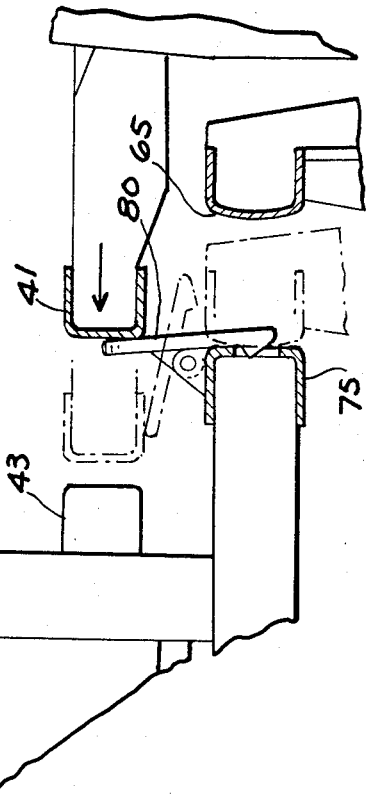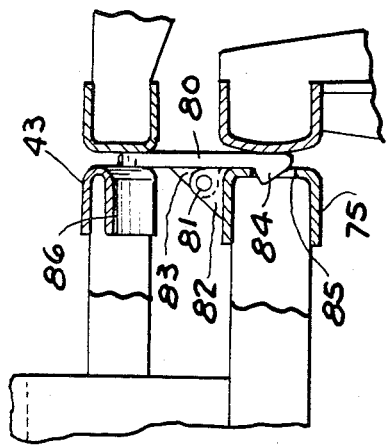

United States Patent Office 3,408,952
Patented Nov. 5, 1968

3,408,952
TOW TRUCK CONVEYOR SYSTEM
Karl R. M. Karlstrom, Roseville, Mich., assignor to Mechanical Handling Systems, Inc., Warren, Mich., a corporation of Michigan
Filed Oct. 31, 1966, Ser. No. 590,722
17 Claims. (Cl. 104—172)

This invention relates to conveyor systems and particularly to tow truck conveyor systems.

In tow truck conveyor systems, a plurality of tow trucks are adapted to be moved along a slot in the floor by engagement of a tow pin on the tow truck with a conveyor beneath the floor. It has heretofore been suggested that structure be provided for permitting the tow trucks to accumulate when an obstacle is encountered. Conventionally, such a structure comprises a front bumper movably mounted on the front of each tow truck and adapted to be moved rearwardly and thereby lift the tow pin. As the front bumper of a leading truck encounters an obstacle, the front bumper moves rearwardly to lift the tow pin and to move a rear bumper into position for engagement with the front bumper of a succeeding truck. Similarly, as each succeeding truck approaches the first or leading truck, the front bumper thereof engages the rear of the leading truck to lift the tow pin of the succeeding truck.

One of the problems with such an accumulating system is that when the obstacle in front of the leading truck is removed, the rear bumper of the leading truck will move away from the front bumper of the succeeding truck permitting the front bumper of the succeeding truck, and in turn each succeeding truck, to move forwardly so that all tow pins will drop at one time and the tow trucks will not be picked up by the conveyor chain in a successive manner.

In addition, it is desirable that the trucks also be adapted to accumulate against another truck or to push it depending on whether the leading truck is stopped through the action of its accumulation bumper or whether it is standing free, as in the case when the chain has pushed the truck into a non-powered spur line. In this case, the first truck is powered into the spur until its tow pin is free of the chain pusher dog. After this it coasts to a stop. In this position it is in the way of the main line traffic, and it is the function of a truck approaching from behind to push it into the spur line until it is clear of the main line traffic. If the trucks were purely accumulating trucks, this could not be done. One truck after another approaching this area would stop, thus producing an intolerable situation.

The pushing of trucks by another is not limited to a single truck, so that several trucks can be pushed into the spur line. The rearmost of the stationary trucks is pushed by an approaching truck and, in turn, pushes one or more trucks ahead of it. The trucks, in this case, function exactly as if they had no accumulation feature at all.

If, however, a truck approaches another which had its accumulation bumper pushed backwards by either a floor stop or any other obstruction, or by an accumulated truck, the approaching truck should automatically become an accumulating truck.

It is therefore an object of this invention to provide an accumulating and pusher type tow truck conveyor system wherein the tow trucks are constructed in such a manner that after an obstacle is removed, the tow trucks are successively picked up and moved along by the conveyor.

It is a further object of the invention to provide a tow truck conveyor system wherein the tow truck is relatively simple in construction, rigid and strong, and can be manufactured at relatively low cost.

In the drawings:

FIG. 1 is a fragmentary part sectional plan view of a tow truck embodying the invention.

FIG. 2 is a diagrammatic plan view of a tow truck system embodying the invention.

FIG. 3 is a fragmentary plan view on an enlarged scale of a portion of the tow truck shown in FIG. 1.

FIG. 4 is a fragmentary view taken in the direction of the arrow 4 in FIG. 3.

FIG. 5 is a part sectional side elevational view of the tow truck.

FIG. 6 is a fragmentary side elevational view showing the relative positions of two trucks, the leading truck having been stopped by an encounter with an obstacle and the succeeding truck being about to contact the leading truck.

FIGS. 10–12 are views similar to FIG. 6 showing the relative positions of the parts during different positions of successive trucks.

Figure 8:
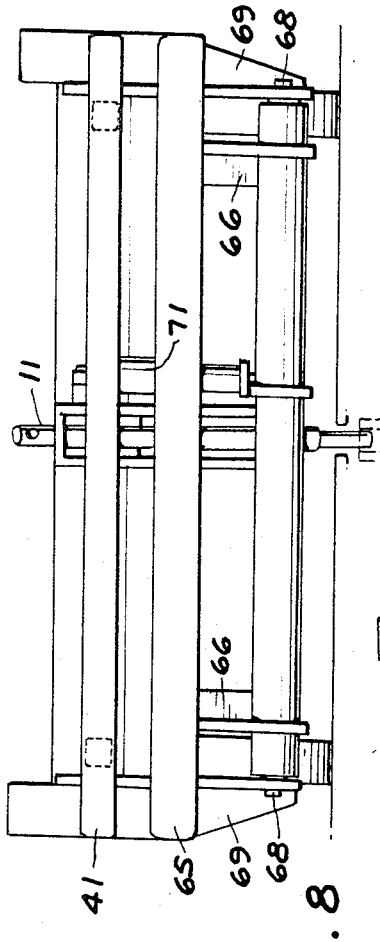
FIG. 8 is a front elevational view of the tow truck.
Figure 7:
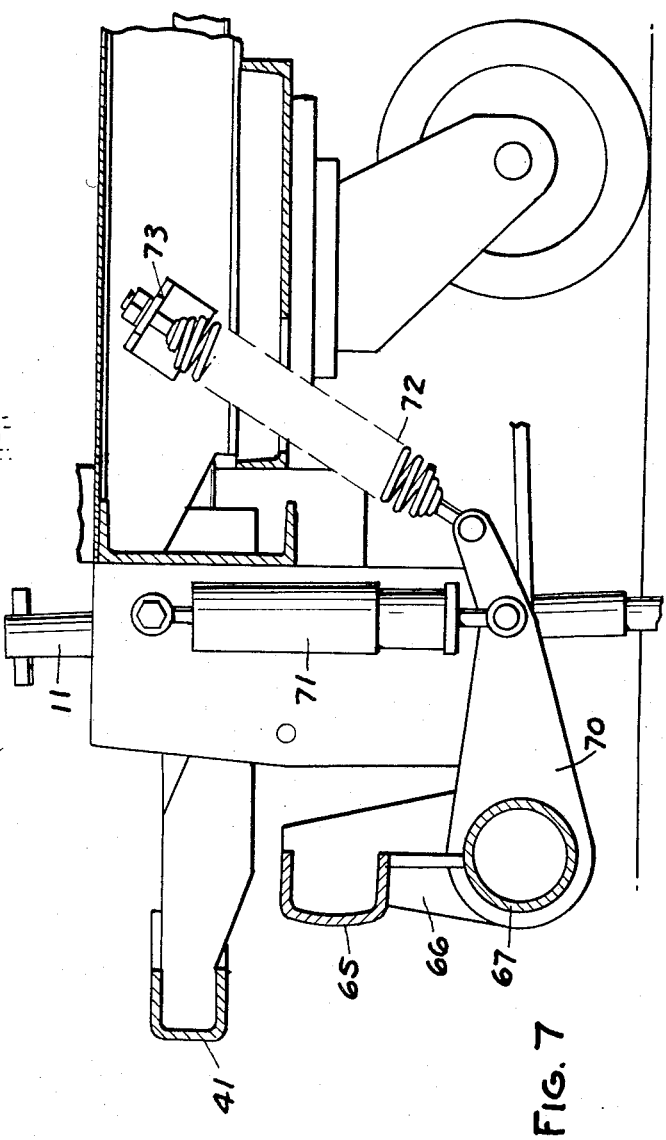
FIG. 7 is a fragmentary sectional view on an enlarged scale taken along the line 7—7 in FIG. 1.

Referring to FIGS. 1 and 2, the tow truck conveyor system embodying the invention comprises a plurality of wheeled tow trucks 10, each of which has a tow pin 11 that extends downwardly into a slot 12 and is engaged by a lug 13 on a conveyor chain 14 beneath the floor to pull the tow truck along the slot. The conveyor system is provided with one or more branch slots 12a into which the tow trucks are diverted upon signal as is well known in the art. As will be hereinafter described, in one type of such system it is desirable that a succeeding tow truck be capable of pushing the diverted tow truck to a position where it clears the path of tow trucks along the main slot 12a.

The tow truck 10 comprises a body which includes a flat plate 15 that is welded on a frame comprising a front member 16, side members 17, a rear member 18 and corner posts 18'. Front and rear members 16, 18 are channel shaped in cross section and side members 17 are angle shaped in cross section. A transverse channel shaped member 19 extends between side members 17 across the front of the frame and caster wheels 20 are mounted on the underside of the member 19. A pair of channel shaped members 21, 22 are provided adjacent the rear of the frame and brackets 23 extend downwardly therefrom to support an axle 24 on which wheels 25 are mounted.

The tow pin 11 is mounted for vertical sliding movement at the front end of the truck body in an opening 26 of a bracket 27. The lower end of the tow pin 11 extends through an elongated opening 28 in the bracket 27 and a circular opening 29 in a link 30 that is slidably mounted for longitudinal movement on the lower end of the bracket 27 by a bolt 31 that extends through an elongated slot 32 in the link. The link 30 is connected to a pair of tension springs 33 which in turn have their ends fixed to a bracket 34 fastened to the body of the truck by plates 35. A shock absorber 36 extends between the link 30 and the bracket 34. The arrangement is such that the springs 33 provide for some limited yielding movement of the tow pin 11 when the lug 13 on the conveyor chain engages the tow pin to thereby minimize the shock. The shock absorber 36 is interrelated with the function of the springs to minimize the shock, all as disclosed and claimed in the patent to Klamp 3,015,284.

Referring to FIGS. 1 and 5, a bumper assembly 40 is slidably mounted within the body of the truck and includes a channel shaped front or accumulation bumper 41 having curved ends 42, a channel shaped rear bumper 43 having curved ends 44 and interconnecting side tube 45 which are rectangular in cross section and are welded to accumulation bumper 41 and rear bumper 43 to produce a rigid rectangular construction. A plate 46 extends between the side tubes 45 intermediate their ends to further rigidify the bumper assembly 40.

As shown in FIGS. 1 and 5, each side tube 45 extends through an opening 47 in the front frame member 16 and an opening 48 in the rear frame member 18. Rollers 49 are mounted with their axes extending horizontally and rollers 50 with their axes extending vertically. The side tube 45 shown in the lower portion of FIG. 1 is guided by two rollers 49 and two rollers 50 near each end, thus providing guiding in vertical and horizontal directions. The side tube 45 shown in the upper portion (not shown) as viewed in FIG. 1 is guided by two rollers 49 near each end, so that it is guided vertically so that binding of the whole bumper assembly during its sliding motion is avoided.

By this arrangement, the front bumper 41 and rear bumper 43 are movable in unison relative to the body of the truck. A tension spring 51 has one end thereof connected to a bracket 52 which extends downwardly from plate 46 and the other end thereof connected to a flange on the transverse member 19 to yieldingly urge the bumper assembly 40 and in turn the accumulation bumper 41 and rear bumper 43 forwardly.

As shown in FIGS. 1 and 5, the front bumper inludes a pair of cam plates 53 which extend rearwardly and have inclined cam surfaces 54 that engage a collar 55 on the tow pin to raise the tow pin 11 when the accumulation bumper 41 is moved rearwardly because of an encounter of the accumulation bumper 41 with an obstacle or other obstruction. The plates 53 engage rollers 56 on bracket 27 to guide their movement.

As further shown in FIG. 5, each of the rear wheels 25 is provided with a cam operated brake of conventional construction that is operated by a rearward swinging movement of a lever 56. Each lever 56 is hinged to a sleeve 63 which has a bore through which the rod 57 passes. The rearward face of sleeve 63 bears against a nut which is threaded on the rear end of rod 57 and locked in place against accidental turning. As will be described, rearward movement of the bumper 41 not only lifts the tow pin, but also moves rods 57 rearward, thereby applying the brakes on the rear wheels 25 by means of the sleeves 63, springs 62 and levers 56. Each spring 62 is backed up by a collar 64 which is pinned to the rod 57, so that each spring 62 applies the required brake actuating pressure.

Each rod 57 is mounted for reciprocating movement in a transverse plate 58 and is yieldingly urged forwardly by a spring 59 that is compressed between the plate 58 and a stop 60 on the rod. The rod 57 also extends through an angled bracket 61 that is fixed to the underside of the plate 46.

When the front bumper 41 encounters on obstacle and is moved rearwardly relative to the frame of the tow truck, the side tubes 45 carry the plate 46 rearwardly causing the bracket 61 to engage the stop and thereby move the rod 57 rearwardly to engage the brake.

Referring to FIGS. 1, 5, 6, 7 and 8, a shock absorbing and cushioning bumper 65 is mounted for swinging movement on the front of the truck. The bumper 65 is fixed to brackets 66 which, in turn, are fixed to a tube 67. Into each end of tube 67 a stub shaft 68 is placed and welded to the tube. Each stub shaft is turned down to a journal end and is mounted in one of the opposite bores in downwardly extending brackets 69 on the front end of the truck body so as to form bearings for a swinging motion of the bumper 65. A lever 70 extends rearwardly from the tube 67 and a shock absorber 71 has one end thereof connected to the lever 70 and the other end thereof connected to the truck body. A spring 72 is also connected to the lever 70 at one end and to a transverse bar 73 extending between the side rail 17 of the truck body. The shock absorber 71 has a high resistance in extending when the bumper 65 encounters an obstacle and a low resistance in collapsing.

As shown in FIG. 5, each truck includes a fixed rear bumper 75 that extends rearwardly below and beyond the normal position of the movable rear bumper 43. In normal operation, as a succeeding truck approaches a leading truck and the leading truck has not encountered an obstacle, the shock absorbing bumper 65 engages the fixed rear bumper 75 of the leading truck. If, however, the leading truck has encountered an obstacle, the rear bumper 43 of the leading truck will have moved to the dotted line position in FIG. 5 or the solid line position in FIG. 10 and the tow pin 11 of the leading truck will have been lifted and the brakes of the leading truck will have been applied. In this position, as shown in FIG. 10, accumulation bumper 41 of the succeeding truck will encounter the movable rear bumper 43 of the leading truck before the shock absorbing bumper 65 of the succeeding truck encounters the fixed bumper 75 of the leading truck.

Figure 9:
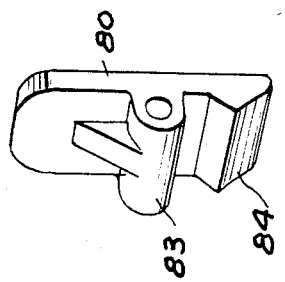
FIG. 9 is a perspective view of a part used on the tow truck.

As shown in FIGS. 3, 4 and 9, a control plate 80 is pivoted by a pin 81 to brackets 82 on the upper central portion of the fixed rear bumper 75. The plate 80 has an integral extension 83 which extends between the brackets 82. The lower end of the plate 80 is formed with a projection 84 that extends forwardly and normally counterweights the plate 80 so that it tends to assume the vertical position with the projection 84 extending through an opening 85 in the fixed rear bumper 75. As shown in FIG. 4, the central portion of the movable rear bumper 43 is deformed or cutaway as at 86 so that the movable bumper 43 does not interfere with the swinging movement of the plate 80, as presently described.

When a first tow truck is stopped by another truck, by a stop or by any other obstruction, its accumulation bumper 41 is moved backward (FIG. 6). The accumulation bumper 41 of a succeeding truck contacts the rear bumper 43 of the first truck and is moved back to lift the tow pin and set the brake of the second truck. During the last part of this motion, the lower fixed bumper 75 of the leading truck is contacted by the lower shock absorbing bumper 65 of the succeeding truck so that the control plate 80 is locked in the vertical position shown in FIG. 10.

If the leading truck in FIG. 2 is released by the object which stopped it, the accumulation bumper 41 moves forward under the action of spring 51 to drop the tow pin 11 and release the brake, but the leading truck does not move until a chain pusher dog 13 engages its tow pin 11.

As bumper 41 of the leading truck moves forward, bumper 41 of the succeeding truck is maintained in its rearward position by control plate 80. In this position, bumper 41 and the tow pin 11 of the second truck are still clear of the chain pusher dogs and the brake of the second truck is still set. Therefore the second truck cannot move or push the first truck forward.

When the first truck is engaged by a chain pusher dog and moves ahead, the control plate 80 of the first truck is no longer restrained and swings counterclockwise due to the force of the bumper 41 of the second truck (FIG. 11). As a result, the tow pin 11 of the second truck is lowered and its brakes are released so that it can be moved ahead by an approaching chain pusher dog.

In this fashion, out of a group of two or more accumulated trucks, only one at a time (the leading one) can have its tow pin lowered and brakes released, the next one following suit only after the first one has moved away. This makes it impossible for the tow pins of several trucks to be lowered simultaneously.

The pushing action of the tow trucks is accomplished as follows: Referring to FIG. 6, the leading truck, if standing free, has its movable rear bumper 43 in the broken line position. The space between it and the accumulation bumper 41 of the following truck is greater than the space between the fixed lower bumper 75 and the cushioning bumper 65. These bumpers 75 and 65 will therefore come in contact first causing the leading, stationary truck to be set in motion with the shock absorbing effect of the cushioning bumper 65. If the latter is pushed back to its limit, the bumper 43 will crowd bumper 41 backward a small distance, but not enough to lift the tow pin, because the cams 54 in FIG. 5 have an initial dwell portion.

If one truck is pushing another, the safety feature of the accumulating bumper is retained. In this case, according to the foregoing, bumper 65 of the second truck is pushing bumper 75 of the first truck. The upper bumper assemblies of both trucks are in the forward position and both tow pins are down. When the leading truck contacts an obstruction other than a free standing truck, its upper bumper assembly is moved backward relative to the truck frame and, in turn, pushes the upper bumper assembly of the trailing truck backward relative to its truck frame until the tow pin of the second truck is free of the chain pusher dog. Now both tow pins are up and the brakes of both trucks are set. After the obstruction is removed, the two trucks are successively set in motion by successive chain pusher dogs as described.

Another feature of the invention is the dual function of the cushioning bumper 65. When accumulating heavily loaded trucks operating at higher speeds and the upper bumper 41 (see FIG. 6) has been crowded back to the position where the lower bumper 75 and cushioning bumper 65 come in contact, the tow pin has been lifted far enough to be clear of the chain pusher dog and the brakes are set. But the approaching truck will travel a few more inches until its energy is absorbed by the brake friction. During this slow-down travel, the cushioning bumper 65 is moved backwards relative to its truck frame and thus helps to brake the truck to a stop. The upper bumper 41 has sufficient overtravel to allow it to move backwards relative to its truck frame during the backward swinging motion of bumper 65. Thus, this cushioning bumper not only softens the impact between a free standing truck and an approaching truck which is to push it, but also aids the brakes of a truck coming to a stop for accumulation.

I claim:

1. In a tow truck conveyor system, the combination comprising
    at least two trucks adapted to be moved along a slot,
    a conveyor adjacent said slot,
    each said truck comprising
    a truck body adapted to be moved along by the conveyor,
    means on said truck body movable into and out of engagement with means on the conveyor,
    a front bumper movably mounted on said truck body and operatively connected with said conveyor engaging means such that when the front bumper is moved rearwardly by contact with an obstacle, said conveyor engaging means is moved out of engagement with said means on the conveyor,
    a rear bumper movably mounted on said truck body,
    means interconnecting said front bumper and said rear bumper whereby when said front bumper engages an obstacle, said rear bumper is moved into position for engagement with the front bumper of the successive truck,
    yielding means urging said front and rear bumpers forwardly,
    and control means on one of said trucks operable when the rear bumper of a leading truck is moved rearwardly by engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means on the conveyor with the conveyor engaging means on the leading truck.

2. The combination set forth in claim 1 wherein said last-mentioned means comprises control means mounted on the rear end of at least each said leading truck and adapted to engage a portion of the succeeding truck,
    said control means when so engaged providing means limiting the forward movement of said front bumper of the succeeding truck under the action of said yielding means.

3. The combination set forth in claim 2 wherein said control means comprises a control lever pivoted on the rear of said leading truck and having a portion thereof projecting into the path of the front bumper of the succeeding truck.

4. The combination set forth in claim 1 wherein each said truck includes a fixed bumper that projects rearwardly beyond the end of said movable rear bumper when said rear bumper is moved to its forwardmost position under the action of said yielding means.

5. The combination set forth in claim 1 including brake means operable by movement of said front bumper by engagement with an obstacle.

6. In a tow truck conveyor system, the combination comprising
    at least two trucks adapted to be moved along a slot,
    a conveyor adjacent said slot,
    each said truck comprising
    a truck body adapted to be moved along by the conveyor,
    means on said truck body movable into and out of engagement with means on the conveyor,
    a front bumper movably mounted on said truck body and operatively connected with said conveyor engaging means such that when the front bumper is moved rearwardly by contact with an obstacle, said conveyor engaging means is moved out of engagement with said means on the conveyor,
    a rear bumper movably mounted on said truck body,
    means interconnecting said front bumper and said rear bumper whereby when said front bumper engages an obstacle, said rear bumper is moved into position for engagement with the front bumper of the successive truck,
    yielding means urging said front and rear bumpers forwardly,
    and control means on one of said trucks operable when the rear bumper of a leading truck is moved rearwardly by an engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means of the conveyor with the conveyor engaging means on the leading truck,
    said mentioned means comprising a control member pivoted on at least each said leading truck and having a portion thereof projecting upwardly for engaging the front bumper of the succeeding leading truck.

7. The combination set forth in claim 6 wherein said control member comprises a plate,
    said control member being biased so that one end thereof is adapted to be moved into position for engagement with a portion of said front bumper when the control member engages a portion of a succeeding truck.

8. The combination set forth in claim 6 including a shock absorbing bumper mounted on the front of said truck and a fixed bumper mounted on the rear of said truck,
    said control member being pivoted to said fixed bumper,
    said control member having a portion adapted to engage said shock absorbing bumper of a succeeding truck.

9. The combination set forth in claim 8 wherein said fixed bumper projects rearwardly beyond the end of said movable rear bumper when said rear bumper is moved to its forwardmost position under the action of said yielding means.

10. In a tow truck conveyor system, the combination comprising
at least two trucks adapted to be moved along a slot,
a conveyor adjacent said slot,
each said truck comprising
a truck body adapted to be moved along by the conveyor,
means on the truck body movable into and out of engagement with means on the conveyor,
a front bumper movably mounted on the truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
mean interconnecting said front bumper and said rear bumper whereby when said front bumper engages an obstacle, said rear bumper is moved into position for engagement with the front bumper of the successive truck,
yielding means urging the front and rear bumpers forwardly,
and control means on at least one of said trucks operable when the rear bumper of a leading truck is moved rearwardly by an engagement of the front bumper of a leading truck with an obstacle and the front bumper of a successive truck engages the rear bumper of said leading truck to prevent the forward movement of the front bumper of said succeeding truck when the obstacle is removed and before the leading truck is moved away from the succeeding truck by engagement of the means on the conveyor with the engaging means on the leading truck,
each said truck having a shock absorbing bumper on the front thereof and a fixed bumper on the rear thereof,
said last mentioned means comprising a control member pivoted on the fixed bumper of each said truck and having a portion thereof projecting into the path of said shock absorbing bumper of a succeeding truck for engaging the shock absorbing bumper of a succeeding truck and another portion extending into the path of the movable front bumper of the succeeding truck when the control member engages the shock absorbing bumper of a succeeding truck.

11. In a truck for use with a conveyor, the combination comprising
a truck body adapted to be moved along by a conveyor,
means on the truck body movable into and out of engagement with means on the conveyor,
a front bumper movably mounted on the truck body and operatively connected with said conveyor engaging means such that when the front bumper is moved rearwardly by contact with an obstacle, said conveyor engaging means is moved out of engagement with said means on the conveyor,
a rear bumper movably mounted on said truck body,
means interconnecting said front bumper and said rear bumper whereby when said front bumper engages an obstacle, said rear bumper is moved into position for engagement with the front bumper of a successive truck,
yielding means urging said front and rear bumpers forwardly,
and means on said truck operable by engagement of said truck with another truck in the rear thereof when said truck has encountered an obstacle to engage the front bumper of said succeeding truck and prevent forward movement of the front bumper of the succeeding truck when the rear bumper of said truck in advance of said succeeding truck moves forwardly due to the removal of the obstacle in the path of the front bumper of the truck in advance of said truck.

12. The combination set forth in claim 11 wherein said last-mentioned means is mounted on a rearward portion of the truck body.

13. The combination set forth in claim 12 wherein said last-mentioned means comprises a control member pivoted on the rear end of said truck and adapted to engage a portion of a leading truck,
said control member when so engaged providing means for limiting the forward movement of the front bumper of the succeeding truck under the action of said yielding means.

14. The combination set forth in claim 13 wherein said control member is counterweighted so that one end thereof is adapted to be moved into position for engagement with a portion of said front bumper when the control member engages a portion of the leading truck.

15. The combination set forth in claim 13 including a shock absorbing bumper mounted on the front of said truck and a fixed bumper mounted on the rear of said truck,
said control lever being pivoted to said fixed bumper.

16. The combination set forth in claim 11 wherein each said truck includes a fixed bumper that projects rearwardly beyond the end of said movable rear bumper when said rear bumper is moved to its forwardmost position under the action of said yielding means.

17. The combination set forth in claim 11 including brake means operable by movement of said front bumper by engagement with an obstacle.

References Cited

UNITED STATES PATENTS 3,103,895    9/1963    Bradt _____ 104—172

ARTHUR L. LA POINT, *Primary Examiner.*

D. F. WORTH, *Assistant Examiner.*